US012443466B2

(12) United States Patent
Pfeifer et al.

(10) Patent No.: US 12,443,466 B2
(45) Date of Patent: Oct. 14, 2025

(54) MANAGE DAEMON FOR EVENT RECONCILIATION IN A COMPUTER SYSTEM

(71) Applicant: SAP SE, Walldorf (DE)

(72) Inventors: Tatjana Pfeifer, Altrip (DE); Raphael Dibbern, Oftersheim (DE); Jonas Braun, Heidelberg (DE); Jens Roessler, Wiesloch (DE); Arne Rantzen, Ketsch (DE); Silvana Straus, St. Leon-Rot (DE)

(73) Assignee: SAP SE, Walldorf (DE)

( * ) Notice: Subject to any disclaimer, the term of this patent is extended or adjusted under 35 U.S.C. 154(b) by 458 days.

(21) Appl. No.: 18/101,405

(22) Filed: Jan. 25, 2023

(65) Prior Publication Data
US 2024/0248773 A1 Jul. 25, 2024

(51) Int. Cl.
*G06F 9/54* (2006.01)
*G06F 9/48* (2006.01)
(52) U.S. Cl.
CPC ............ *G06F 9/542* (2013.01); *G06F 9/4806* (2013.01)
(58) Field of Classification Search
CPC .............................. G06F 9/542; G06F 16/1734
See application file for complete search history.

(56) References Cited

U.S. PATENT DOCUMENTS

| 7,028,229 | B2 * | 4/2006 | McGuire | ................. | G06F 9/545 |
| | | | | | 714/49 |
| 10,810,064 | B2 * | 10/2020 | Adolfsson | .............. | G06Q 40/04 |
| 2021/0064450 | A1 | 3/2021 | Nugent et al. | | |

OTHER PUBLICATIONS

"European Application Serial No. 23208781.7, Extended European Search Report mailed May 14, 2024", 11 pgs.
"Amqp—Apache Kafka bridge README.md at master yumok amqp-kafka-bridge GitHub", GitHub, [Online]. Retrieved from the Internet: URL: https: github.com yumok amqp-kafka-bridge blob master README.md, (Mar. 1, 2017), 2 pgs.
"History for README.md—yumok amqp-kafka-bridge GitHub", GitHub, [Online]. Retrieved from the Internet: URL: https: github.com yumok amqp-kafka-br idge commits master README.md, (Mar. 1, 2017), 2 pgs.
Ferreira, Ricardo, "Implementing Message Prioritization in Apache Kafka", [Online]. Retrieved from the Internet: URL: URL: https: www.confluent.io blog prioritize-messages-in-kafka , (Sep. 10, 2022), 11 pgs.

* cited by examiner

*Primary Examiner* — Andy Ho
(74) *Attorney, Agent, or Firm* — SCHWEGMAN LUNDBERG & WOESSNER, P.A.

(57) ABSTRACT

In an example embodiment, multiple different categories of events from an Enterprise application are separated and processed by different daemons. This allows events of a first category, such as business events, to be processed separately from events of a second category, such as configuration events. This provides the benefits of stable event processing, additional monitoring functionality, and specialized error handling.

20 Claims, 6 Drawing Sheets

MANAGE DAEMON FOR EVENT RECONCILIATION IN A COMPUTER SYSTEM

TECHNICAL FIELD

This document generally relates to computer systems. More specifically, this document relates to use of a master daemon for event reconciliation.

BACKGROUND

A message broker is software that enables applications, systems, and services to communicate with each other and exchange information. Message brokers can be used for asynchronous communication using a publish/subscribe model. In this message distribution pattern, the source of each message publishes the message to a topic at the message broker, and multiple message consumers subscribe to topics from which they want to receive messages. All messages published to a topic are distributed to all the applications subscribed to it.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
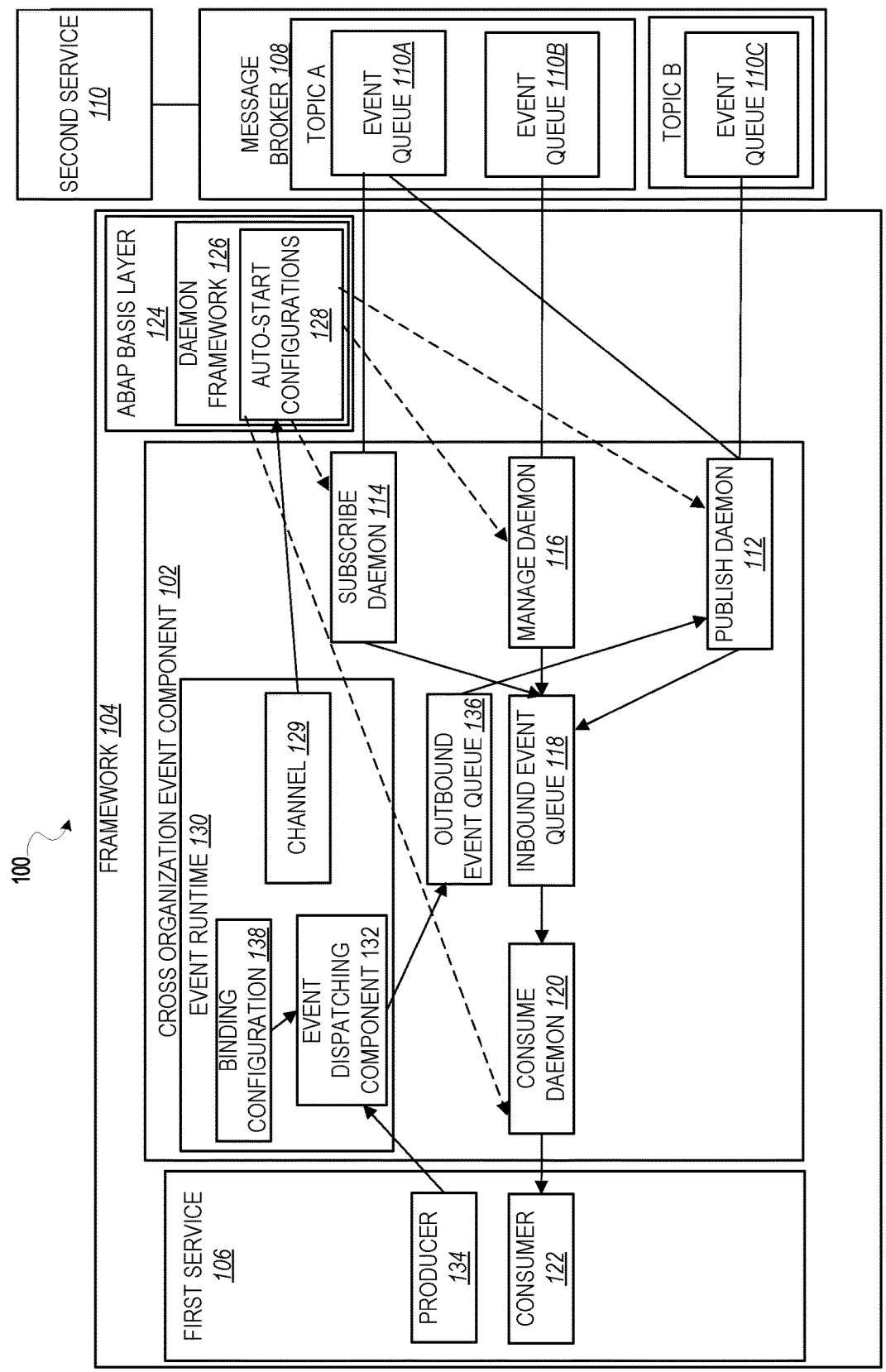
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Message brokers may be used in a cloud environment to enable enterprise event monitoring. An event is a data record expressing a change in a state and its surrounding context. Typically events contain at least two types of information: the event data representing the occurrence and context metadata providing contextual information about the occurrence. Events are routed from an event producer (the source) to interested event consumers, using a message broker.

Enterprise events are events related to a particular enterprise. There are many different categories of events that can be classified as enterprise events including, but not limited to, business events and configuration events. A business event is an event generated from a change in data pertaining to the data. A configuration event is an event that changes some property of the functioning of the application itself. For example, a business event may be a change of a business object such as a business partner. A configuration event is an event that causes a change in the parameter or the functioning of the channel and/or topic in which business events are transmitted. The following are example configuration events:

```
em.Reconcile.Requested.v1
{
  "specversion": "1.0",
  "source": "/eu10/sap.em/data-plane-01",
  "type": "em.Reconcile.Requested.v1",
  "id": "60eafe92-137e-423c-8efe-21863a3647a3",
  "time": "2021-08-05T17:31:00Z",
  "datacontenttype": "application/json",
  "data": {
    "revision": "123456789",
    "produces": {
      "items": [
        {
          "publishingID": "a2975391-1fde-44c3-bea3-aaaaaaaaaaaa",
          "source": "default/s4.sales/cfcfcfcf-acac-acac-acac-efefefefef",
          "type": "sap.s4.sales.order.created.v1",
          "consumptionType": "BOTH",
          "subscriptions": [
            "42424242-1fde-4aaa-bea3-016d7b6731fd",
            "a2975391-1fde-44c3-bea3-016d7b6731fd"
          ]
        }
      ]
    },
    "consumes": {
      "items": [
        {
          "subscriptionID": "52975391-1fde-44c3-bea3-01d7b6731fd",
          "status": "modified",
          "application": "12345678-1234-4242-4242-17595164221",
          "source": "/eu10/sap.sf.wa/429322",
          "type": "sa.odm.workforce.WorkforceAvailability.Created.v1",
          "filter": {
            "conditions": [
              {
                "dialect": "basic",
                "type": "prefix",
                "property": "countrycode",
                "value": "de"
              }
            ]
          }
        },
        {
          "subscriptionID": "879accc9-8642-4947-9780-da84d7b435c",
          "status": "accepted",
          "application": "12345678-1234-4242-4242-17595164221",
          "source": "/eu10/sf.wa/429322",
          "type": "sa.odm.workforce.WorkforceAvailability.Deleted.v1"
        }
      ]
    }
  }
}
em.Reconcile.Completed.v1
{
  "specversion": "1.0",
  "source": "/eu10/em/data-plane-01",
  "type": "em.Reconcile.Completed.v1",
  "id": "1248f757-22aa-429e-b473-b8e202793ef6",
  "time": "2018-04-05T17:32:00Z",
  "datacontenttype": "application/json",
```

-continued

```
"data": {
    "revision": "123456789",
    "produces": [
        {
            "publishingID": "a2975391-1fde-44c3-bea3-aaaaaaaaaaaa",
            "conditions": [
                {
                    "status": "false",
                    "type": "ready",
                    "reason": "error",
                    "message": "producer inactive, CRM not activated"
                }
            ]
        }
    ],
    "consumes": [
        {
            "subscriptionID": "52975391-1fde-44c3-bea3-01d7b6731fd",
            "conditions": [
                {
                    "status": "false",
                    "type": "ready",
                    "reason": "error",
                    "message": "consumer inactive, software component not installed"
                }
            ]
        },
        {
            "subscriptionID": "879accc9-8642-4947-9780-da84d7b435c",
            "conditions": [
                {
                    "status": "true",
                    "type": "ready"
                }
            ]
        }
    ]
}
```

When a software application is integrated into an application framework, such as the Advanced Business Application Programming (ABAP) framework from SAP SE of Walldorf, Germany, communications between the application and other applications in the framework may be handled via a message broker, such as the SAP Event Mesh™ (EM) from SAP SE of Walldorf, Germany. Event notifications (also called notification events) can be sent from the system in which the event occurred, to inform other systems, microservices, and applications of the change. There are different specifications for describing event data in a common way, such as CloudEvents. Typically the event does not contain the relevant (business) data but informs the interested consumer that something has changed. F. For example: the event BusinessPartner. Created would transport only the ID of the new Business Partner record. To retrieve the full record the consumer would need to call the producer system directly.

In contrast to notification events, there may also be data events, which contain the full set of relevant (business) data for which the event has raised. For example, here the event would transport the entire record of the new Business Partner. It is contemplated that aspects of the present disclosure apply to either or both these types of events. Other categories of event, such as configuration events, may also be present.

If all the categories of enterprise events, such as business events and configuration events, however, are published to the same topic (which typically correspond to a channel described by the application), then performance of the system, and specifically the performance of an event stack storing events to be processed, will suffer. This is because the business event processing may block the configuration event processing, causing processing of the configuration events to be delayed. This can cause cascading technical issues, because the configuration events contain changes that are needed to properly process the business events.

Further, the business process will also suffer. For example, the processing of a configuration event may wind up preventing a business event from being published, or processing of as business event can be delayed while a configuration event is processed.

In an example embodiment, multiple different categories of events from an Enterprise application are separated and processed by different daemons. This allows events of a first category, such as business events, to be processed separately from events of a second category, such as configuration events. This provides the benefits of stable event processing, additional monitoring functionality, and specialized error handling.

More particularly, a manage daemon is introduced that monitors and processes higher priority event categories, such as configuration events. Lower priority events can be continued to be monitored using a different type of daemon, specifically a subscribe daemon. In this way, reconciliation of configuration events are not disturbed by the processing of regular business events.

In ABAP, daemons are long-living ABAP sessions that can be used to constantly monitor for and react to events. Essentially, the daemons are continuously running background sections, used in the event processing context to enable asynchronous processing of events. In order to prevent the sending or receiving of events of different categories from blocking each other, they can be handled by separate daemon sessions.

The message broker may distinguish between the categories of events using different queue addresses. Therefore, for example, configuration events can be processed on a first queue address (for a manage daemon) while business events are handled on a second queue address (for a subscribe daemon).

This clean separation of the different event categories on the side of the message broker allows the event stack to continue this separation. The separation on the event stack-side is achieved through the use of the additional manage daemon operating at the corresponding queue address.

FIG. 1 is a block diagram illustrating a system 100, in accordance with an example embodiment. A cross organization event component 102 may reside within a framework 104, such as an ABAP framework. A first service 106 may intend to produce and consume events to and from a message broker 108, but rather than communicate directly with the message broker 108, the first service communicates with the cross-organization event component 102, which manages the events.

Other services, such as a second service 110 communicate directly with the message broker 108. The message broker 108 maintains a plurality of event queues 110A, 110B, 110C. While typically there would be one event queue 110A, 110B, 110C for each topic that a service can publish and/or subscribe to, in an example embodiment, topic A actually has two separate event queues 110A, 110B on the message broker, each corresponding to a different event category within topic A. Thus, for example, event queue 110A may correspond to business events, while event queue 110B may correspond to configuration events.

It should also be noted that while this discussion mentions topics, the use of topics per set is not mandatory for implementation of the present solution. Specifically, in some example embodiments, a particular channel is defined that has only two valid subscription addresses: one for business events and one for configuration events. This essentially creates a new type of subscription type kind where rather than subscribing to a topic the subscription is to a particular subscription address of the channel, depending upon which event category is being utilized. Here, a new field is created for event metadata called "event_purpose", which is specifically used for configuration events.

For business events, the event purpose field is set to "initial", while for configuration events the purpose field is set to "c". the event purpose is determined by the corresponding event consumer or producer. It is assigned during the finalization of the event description, and stored in the description header. Hence, the purpose field of a configuration event is set to c for reconciliation events, and other event producers have the purpose field set to initial.

Since this channel is automatically managed using configuration events, it need not be shown when configuring channel bindings. In order to prevent this from being shown, an additional where condition in the corresponding view is provided that selects only channels where management type is user managed.

Referring back to FIG. 1, on the cross organization event component 102, a publish daemon 112 may publish events generated by the first service 106 to the message broker 108, and subscribing services, such as perhaps the second service 110, may then be asynchronously pushed those published events, at least for topics that the subscribing services have subscribed to. Thus, for example, if the second service 110 subscribes to topic B, then an event related to topic B generated by the first service 106 is published by the publish daemon 112 to the message broker 108, which stores the event in the corresponding event queue 110C, and then the message broker 108 pushes that event to the first service 106 (and any other services subscribing to topic B).

A subscribe daemon 114 might under different circumstances be monitoring all incoming events for any topics subscribed to by the first service 106 (thus essentially monitoring events from any event queue for a subscribed topic). Here, however, as mentioned above, a distinction is made between events of a first category and events of a second category. Thus, for example, the subscribe daemon 114 may only monitor business events generated by the message broker 108. Event of another category may be instead monitored by a manage daemon 116. Thus, in this example, the subscribe daemon 114 only monitors business events, generated by the message broker 108 from event queue 110A, which corresponds to a business event queue, while the manage daemon only monitors configuration events, generated by the message broker 108 from event queue 110B, which corresponds to a configuration events queue.

In an example embodiment, the links between the message broker and the publish daemon 112, subscribe daemon 114, and manage daemon 116 are AMQP channels. AMQP is a framing and transfer protocol that can be used for symmetric peer-to-peer communication. It is bidirectional, and can connect an AMQP client, which may be contained in each of the publish daemon 112, subscribe daemon 114, and manage daemon 116, and the message broker 108.

Notably, the manage daemon 116 has its own AMQP channel or other WebSocket connection that is assigned during initialization. This AMQP channel is controlled by the manage daemon 116. This means that the error handling of the AMQP runtime channel, such as for reconnecting or republishing failed events, is controlled by the manage daemon 116.

Thus, only configuration events are received over this AMQP connection. When a new configuration event is received, an event handler is called and the event handed over to the event handler, after extracting corresponding cloud event data. The event purpose is then set to what is stored in a member variable of the AMQP channel. This is important because it enables the solution to omit any inbound topic or topic consumer bindings of the channel for the configuration event processing. More specifically, the solution does not need to search for the corresponding topic consumer of the given event topic and check if an according topic binding is maintained, as any configuration event is processed on the special channel.

The subscribe daemon 114 then manages the business events generated on topic A, while the separate manage daemon 116 manages the configuration events generated on topic A, preventing the processing of the business events from interfering with the processing of the configuration events. Once processed, both the subscribe daemon 114 and manage daemon 116 write their events to an inbound event queue 118, which then gets consumed by a consume daemon 120 and processed to send the events to a consumer 122 on the first service 106.

An ABAP Basis layer 124 may contain a daemon framework 126, which contains auto-start configurations 128 for the various daemons 112, 114, 116, and 120. The daemon framework 126 automatically starts and/or restarts the daemons 112, 114, 116, and 120. The auto-start configurations 128 may be created by a channel 129 in an event runtime 130.

The event runtime 130 also contains an event dispatching component 132, which receives events from a producer 134 on the first service 106 and writes those events into an outbound event queue 136, from which the events are retrieved by the publish daemon 112 for publishing on an AMQP outbound link to the message broker 108. The event dispatching component 132 further determines channels and bindings from a binding configuration 138. The binding configuration also provides consumer information to the consume daemon upon request.

In an example embodiment, the first service 106 provides a reconciler process that processes a configuration event received via consumer 122, and pushes a response event to the outbound event queue 136. The manage daemon 116 then picks the configuration response event from the outbound event queue 136 and sends it to the message broker 108.

FIG. 1 above describes an example embodiment where the manage daemon 116 is separate from the subscribe daemon 114, but both send events (via the inbound event queue 118) to the same consume daemon 120. In other example embodiments, to further improve processing, the manage daemon has its own dedicated consumer daemon, either located generally in the cross organization event component 102, or contained within the consume daemon 120 itself. In order to accomplish this, an additional purpose field may be added to an event database. The event purpose field could be set for the specific reconcile event producer, so that during the event production the purpose is automatically added. This allows for separation of configuration and business events throughout the entire event processing.

Figure 2:
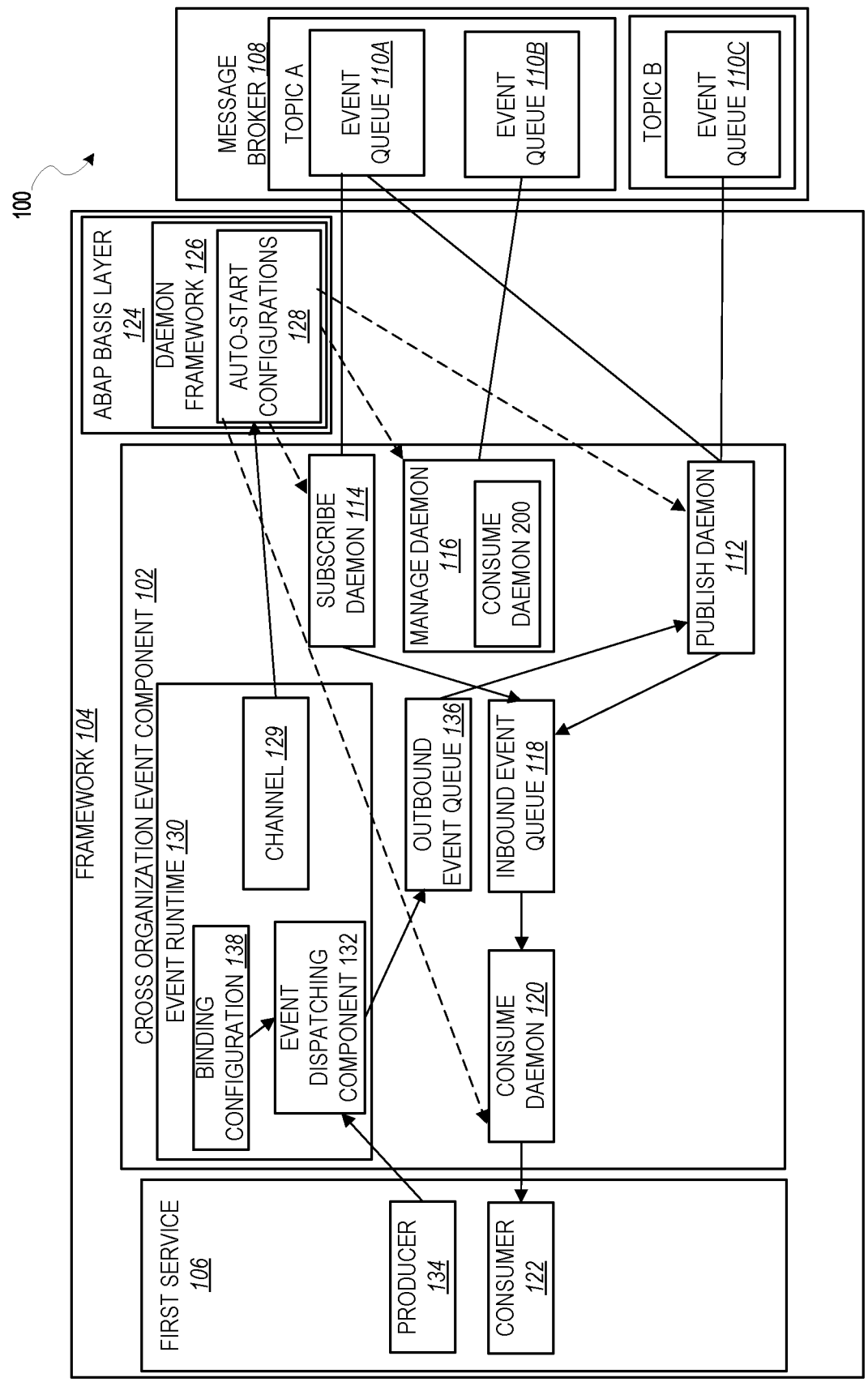
FIG. 2 is a block diagram illustrating an example embodiment having a separate consume daemon located inside the manage daemon, in accordance with an example embodiment.

FIG. 2 is a block diagram illustrating an example embodiment having a separate consume daemon 200 located inside the manage daemon 116. As can be seen, the manage daemon 116 no longer sends configuration events to outbound event queue 136, for sending to the consumer daemon 120, but instead utilizes consume daemon 200. The other components in FIG. 2 operate similarly to that of FIG. 1.

In an example embodiment, the various daemons 112, 114, 116, 120 and/or 200 may be managed by a daemon manager (not pictured). This daemon manager manages channel-specific daemon configurations and ensures the readiness of the daemons 112, 114, 116, 120 and/or 200. This means that during a design time change, the daemon manager starts and stops daemons as well as creating the configuration. During runtime, the daemon manager may also be called, triggering a restart which restarts running daemons and/or starts inactive ones.

Once a channel is activated, the daemon manager creates different configurations for the channel, including a configuration for the publish daemon 112, a configuration for the subscribe daemon 114, and a configuration for the manage daemon 116, all for monitoring events to that channel on the message broker 108.

Notably, in some example embodiments, there is only one daemon instance created of each daemon. However, in other example embodiments, it is possible for performance reasons to increase the number of daemons per scenario. This allows, for example, the daemon instances to be distributed, or parallelized (or both). Different distribution methods may be utilized to determine which daemon instance of a particular scenario (e.g., publisher, subscribe, manage) to send an event to. Examples include first come first served, round robin, and distribution based on a unique identifier. In the first come first served method, a new event is distributed to the first available instance of the corresponding daemon. A lock mechanism may be used to prevent errors. In round robin, a new event is assigned to a different available instance, rotating around the available instances. Here, however, the ordering of events may not be guaranteed. In the unique identifier distribution method, each daemon is responsible for a different specific identifier. The distribution is determined using a hash value and a modulo function, which determines which daemon is responsible for the event based on information about the event, such as the subject field.

In some example embodiments, the number of daemons may be dynamically adjusted, thus only using as many resources as required. A technical issue is encountered, however, in that it can be complicated by the fact that the daemons need to be synchronized so that every event is published exactly once and in the correct order. In an example embodiment, a unique identifier/hash value is contained in events, which is independent of the number of domains. Each daemon has its own index and is responsible only for those events where the hash value modulo the number of daemons equals its daemon index. Moreover, the number of daemons can be automatically increased and decreased depending on the load.

A load balancer reads all events and evenly distributes them to the available daemons using the unique processor ID of the daemons. Moreover, the number of daemons is automatically increased and decreased depending on the load.

As an alternative to dynamic adjusting the number of daemons, in some example embodiments the number of daemons is statically scaled, which means that during the configuration of the channel, the number of publish daemon's can be set but is not changed during runtime. This avoids all the synchronizing issues of a dynamically scaling approach.

During runtime, the communications with the actual daemons 112, 114, 116, 120 and/or 200 are handled asynchronously to avoid blocking.

Figure 3:
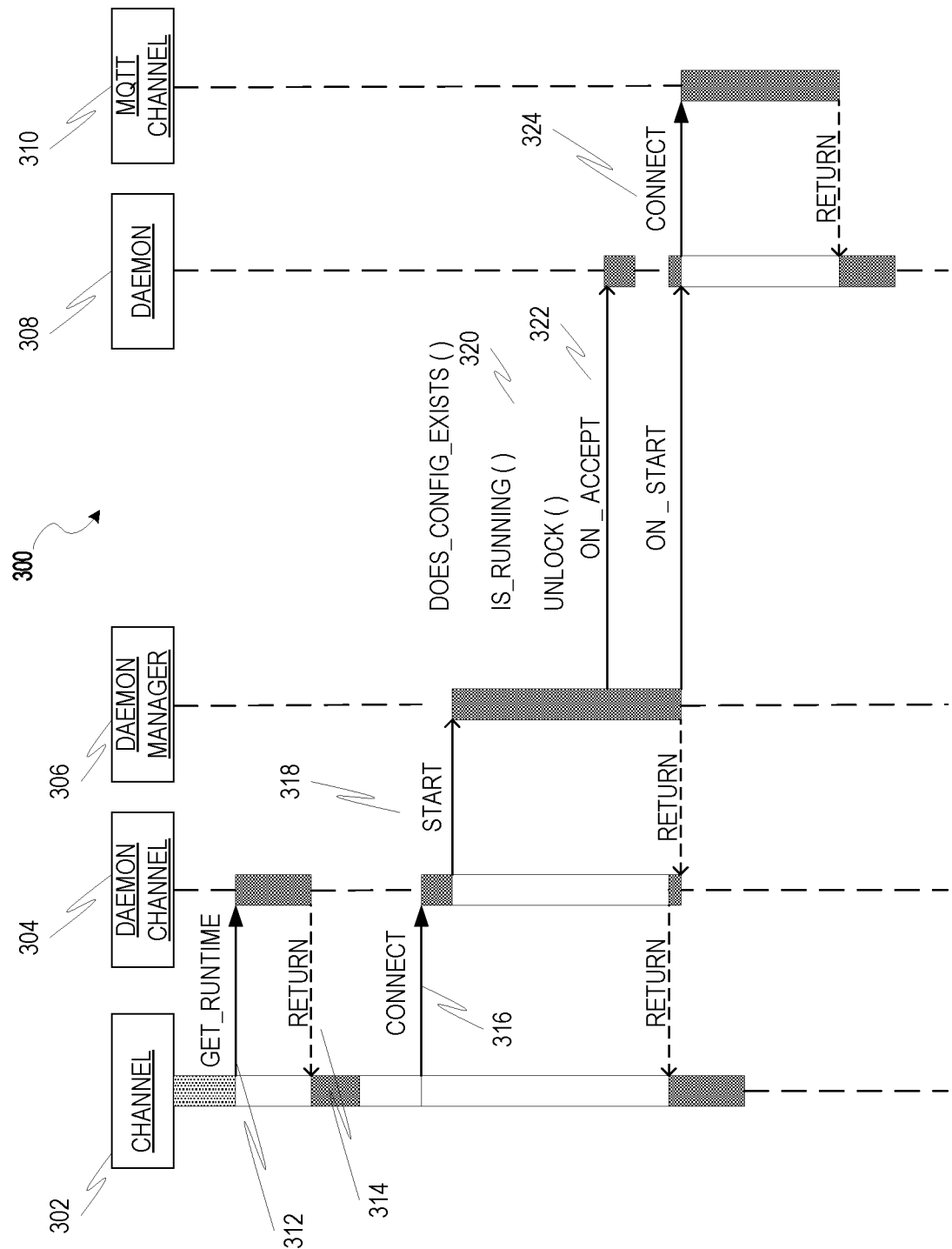
FIG. 3 is a sequence diagram illustrating a method for opening a channel, in accordance with an example embodiment.

FIG. 3 is a sequence diagram illustrating a method 300 for opening a channel, in accordance with an example embodiment. This method 300 utilizes a channel 302, daemon channel 304, daemon manager 306, daemon 308, and a Message Queueing Telemetry Transport (MQTT) channel 310. At operation 312, the channel 302 gets a runtime from the daemon channel 304, which returns it at operation 314. At operation 316, the channel 302 connects to the daemon channel 304, and at operation 318, the daemon channel 304 starts the daemon manager 306.

At operation 320, the daemon manager runs a series of commands, including determining whether one or more daemon configurations exist, whether one or more daemons corresponding to the one or more daemon configurations are running, and unlocking any locked daemons. At operation 322, any nonrunning daemons are launched, including daemon 308. At operation 324, the daemon 308 connects to the MQQT channel 310 to perform actions relating to the daemon's purpose, such as processing inbound events or publishing outbound events.

Figure 4:
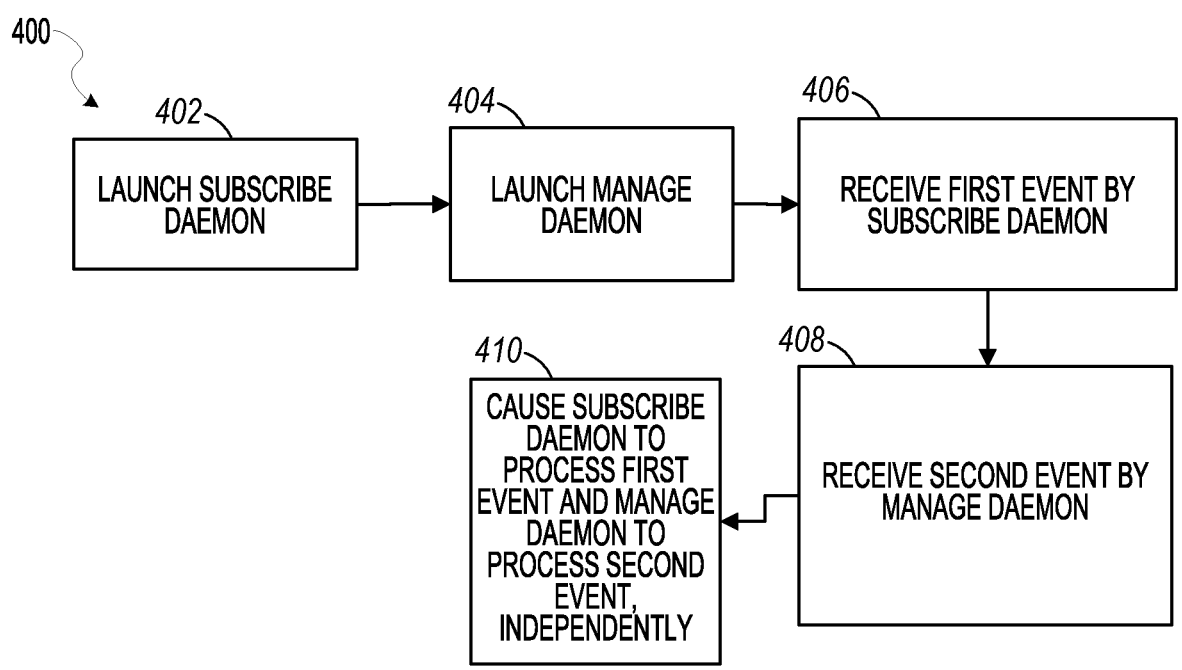
FIG. 4 is a flow diagram illustrating a method, in accordance with an example embodiment.

FIG. 4 is a flow diagram illustrating a method 400, in accordance with an example embodiment. At operation 402, a subscribe daemon is launched on a computer server. The subscribe daemon monitors a first topic or channel on a message broker for published events of a first event category to the first topic or channel. In an example embodiment, the computer service is an ABAP server. At operation 404, a manage daemon on the computer server. The manage daemon monitors the first topic or channel on the message broker for published event of a second event category.

At operation 406, a first event is received by the subscribe daemon. The first event belongs to the first category and is published to the first topic or channel on the message broker. At operation 408, a second event is received by the manage daemon. The second event belongs to the second category and is published to the first topic or channel on the message broker.

At operation 410, the subscribe daemon is caused to process the first event and the manage daemon is caused to process the second event, the subscribe daemon performing its processing independently of the processing of the manage daemon. This may include both the subscribe daemon and the manage daemon writing their respective events to an inbound event queue, from which a consume daemon may retrieve them. Alternatively, the subscribe daemon writes its events to the inbound event queue and the manage daemon writes its events directly to a consume daemon in the manage daemon.

It should be noted that the above disclosure describes embodiments where the distinction between or among the event categories is made via the queue addresses, and specifically that different queue addresses correspond to different categories. In other example embodiments, there are other ways that the event category for an incoming event is determined. In one example embodiment, for example, the header and/or body of the event can be parsed to identify indications of an event category. These indications may either be explicit (e.g., a tag or flag indicating an event category) or implicit (e.g., the contents of the body of the event match a typical pattern for configuration events). In even other example embodiments, machine learning may be utilized to predict the event category for an incoming event. For example, a machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the machine learning model may iterate among various weights (which are the parameters) that will be multiplied by various input variables (such as values in the body of the vent) and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the machine learning model may take place as a dedicated training phase. In other example embodiments, the machine learning model may be retrained dynamically at runtime by the user providing live feedback.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
launching a subscribe daemon on a computer server, the subscribe daemon monitoring a first topic or channel on a message broker for published events of a first event category to the first topic or channel;
launching a manage daemon on the computer server, the manage daemon monitoring the first topic or channel on the message broker for published event of a second event category;
receiving, by the subscribe daemon, a first event, the first event belonging to the first category, published to the first topic or channel on the message broker;
receiving by the manage daemon, a second event, the second event belonging to the second category, published to the first topic or channel on the message broker; and
causing the subscribe daemon to process the first event and the manage daemon to process the second event, the subscribe daemon performing its processing independently of the processing of the manage daemon.

Example 2. The system of Example 1, wherein the manage daemon is connected to the message broker via a separate link than the subscribe daemon is connected to the message broker.

Example 3. The system of Example 2, wherein the separate link is an AMQP link.

Example 4. The system of any of Examples 1-3, wherein the processing of the first event by the subscribe daemon is performed by writing the first event to an inbound event queue, which is monitored by a consume daemon, and wherein the consume daemon retrieves the first event from the event queue and publishes it to a first subscribing service.

Example 5. The system of Example 4, wherein the processing of the second event by the manage daemon is performed by writing the second event to the inbound event queue, and wherein the consume daemon retrieves the second event from the event queue and processes a change to the topic or channel based on the second event.

Example 6. The system of Example 4, wherein the processing of the second event by the manage daemon is performed by writing the second event to a consume daemon contained within the manage daemon, wherein the consume daemon processes a change to the topic or channel based on the second event.

Example 7. The system of any of Examples 1-6, wherein the second category is configuration events.

Example 8. A method comprising:
launching a subscribe daemon on a computer server, the subscribe daemon monitoring a first topic or channel on a message broker for published events of a first event category to the first topic or channel;
launching a manage daemon on the computer server, the manage daemon monitoring the first topic or channel on the message broker for published event of a second event category;
receiving, by the subscribe daemon, a first event, the first event belonging to the first category, published to the first topic or channel on the message broker;
receiving by the manage daemon, a second event, the second event belonging to the second category, published to the first topic or channel on the message broker; and
causing the subscribe daemon to process the first event and the manage daemon to process the second event, the subscribe daemon performing its processing independently of the processing of the manage daemon.

Example 9. The method of Example 8, wherein the manage daemon is connected to the message broker via a separate link than the subscribe daemon is connected to the message broker.

Example 10. The method of Example 9, wherein the separate link is an AMQP link.

Example 11. The method of any of Examples 8-10, wherein the processing of the first event by the subscribe daemon is performed by writing the first event to an inbound event queue, which is monitored by a consume daemon, and wherein the consume daemon retrieves the first event from the event queue and publishes it to a first subscribing service.

Example 12. The method of Example 11, wherein the processing of the second event by the manage daemon is performed by writing the second event to the inbound event queue, and wherein the consume daemon retrieves the second event from the event queue and processes a change to the topic or channel based on the second event.

Example 13. The method of Example 11, wherein the processing of the second event by the manage daemon is performed by writing the second event to a consume daemon contained within the manage daemon, wherein the consume daemon processes a change to the topic or channel based on the second event.

Example 14. The method of any of Examples 8-13, wherein the second category is configuration events.

Example 15. A non-transitory machine-readable medium storing instructions which, when executed by one or more processors, cause the one or more processors to perform operations comprising:
launching a subscribe daemon on a computer server, the subscribe daemon monitoring a first topic or channel on a message broker for published events of a first event category to the first topic or channel;

launching a manage daemon on the computer server, the manage daemon monitoring the first topic or channel on the message broker for published event of a second event category;

receiving, by the subscribe daemon, a first event, the first event belonging to the first category, published to the first topic or channel on the message broker;

receiving by the manage daemon, a second event, the second event belonging to the second category, published to the first topic or channel on the message broker; and causing the subscribe daemon to process the first event and the manage daemon to process the second event, the subscribe daemon performing its processing independently of the processing of the manage daemon.

Example 16. The non-transitory machine-readable medium of Example 15, wherein the manage daemon is connected to the message broker via a separate link than the subscribe daemon is connected to the message broker.

Example 17. The non-transitory machine-readable medium of Example 16, wherein the separate link is an AMQP link.

Example 18. The non-transitory machine-readable medium of any of Examples 15-17, wherein the processing of the first event by the subscribe daemon is performed by writing the first event to an inbound event queue, which is monitored by a consume daemon, and wherein the consume daemon retrieves the first event from the event queue and publishes it to a first subscribing service.

Example 19. The non-transitory machine-readable medium of Example 18, wherein the processing of the second event by the manage daemon is performed by writing the second event to the inbound event queue, and wherein the consume daemon retrieves the second event from the event queue and processes a change to the topic or channel based on the second event.

Example 20. The non-transitory machine-readable medium of Example 18, wherein the processing of the second event by the manage daemon is performed by writing the second event to a consume daemon contained within the manage daemon, wherein the consume daemon processes a change to the topic or channel based on the second event.

Figure 5:
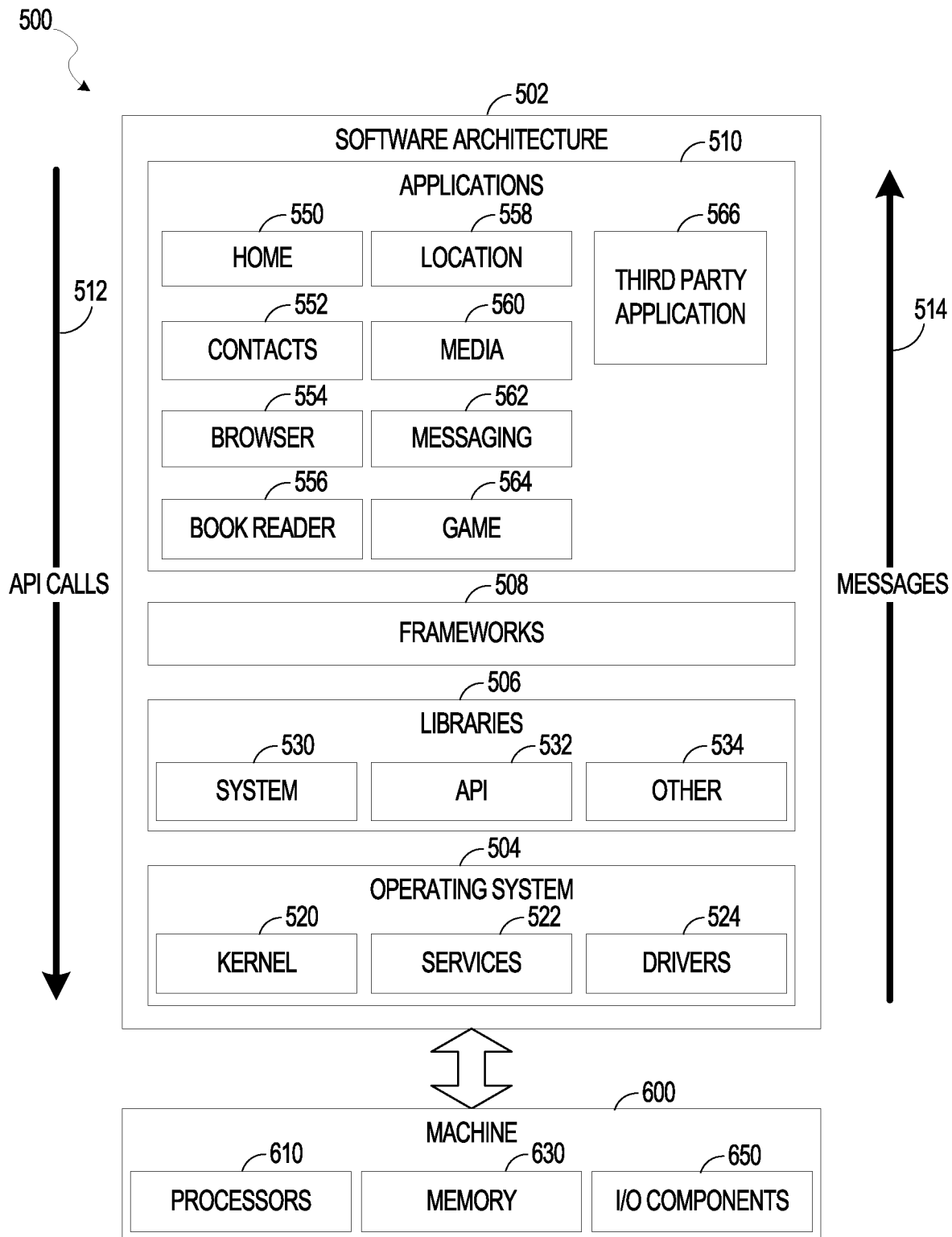
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
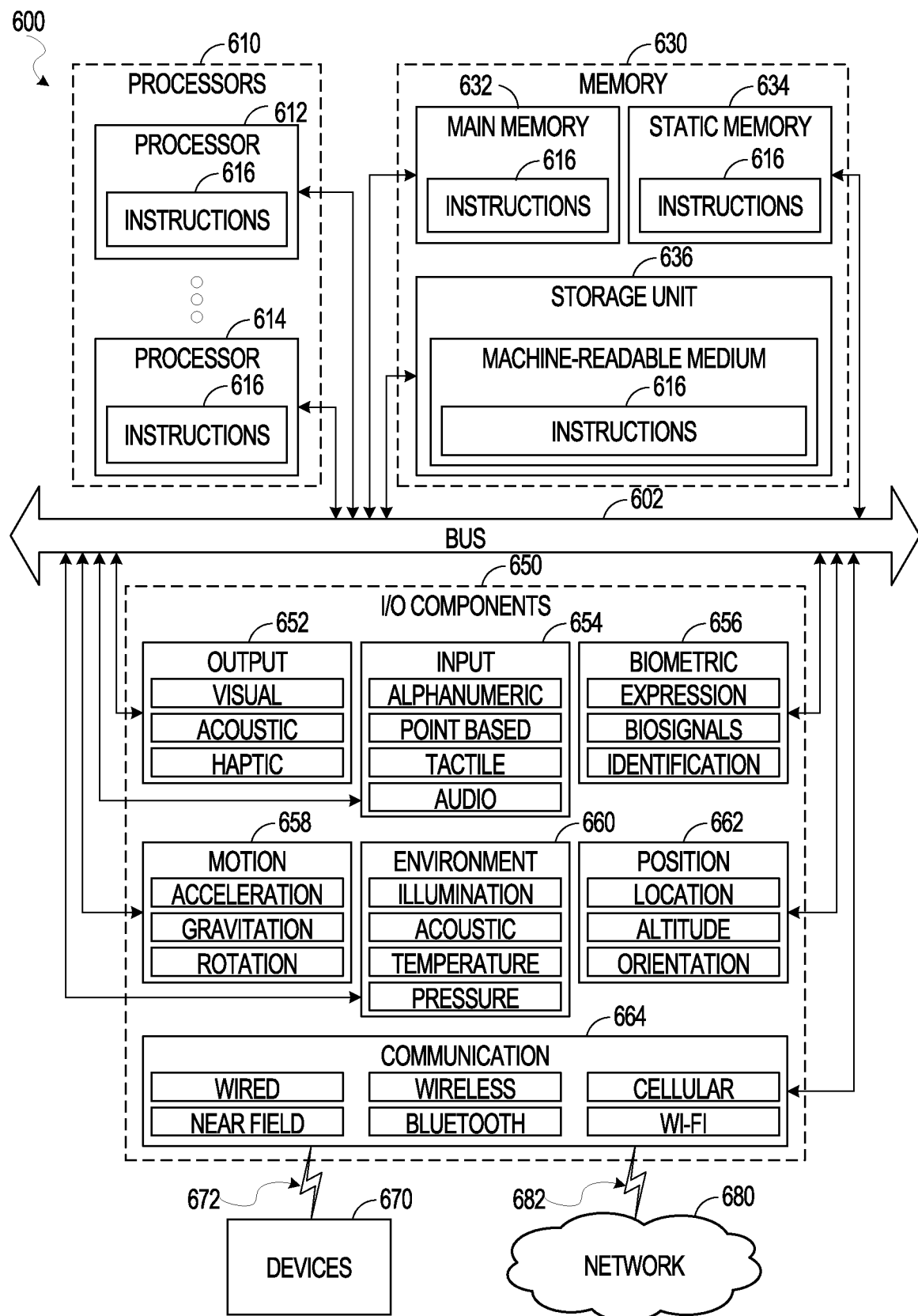
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   launching a subscribe daemon on a computer server, the subscribe daemon monitoring a first topic or channel on a message broker for published events of a first event category to the first topic or channel;

launching a manage daemon on the computer server, the manage daemon monitoring the first topic or channel on the message broker for published event of a second event category;

receiving, by the subscribe daemon, a first event, the first event belonging to the first category, published to the first topic or channel on the message broker;

receiving by the manage daemon, a second event, the second event belonging to the second category, published to the first topic or channel on the message broker; and causing the subscribe daemon to process the first event and the manage daemon to process the second event, the subscribe daemon performing its processing independently of the processing of the manage daemon.

2. The system of claim 1, wherein the manage daemon is connected to the message broker via a separate link than the subscribe daemon is connected to the message broker.

3. The system of claim 2, wherein the separate link is an AMQP link.

4. The system of claim 1, wherein the processing of the first event by the subscribe daemon is performed by writing the first event to an inbound event queue, which is monitored by a consume daemon, and wherein the consume daemon retrieves the first event from the event queue and publishes it to a first subscribing service.

5. The system of claim 4, wherein the processing of the second event by the manage daemon is performed by writing the second event to the inbound event queue, and wherein the consume daemon retrieves the second event from the event queue and processes a change to the topic or channel based on the second event.

6. The system of claim 4, wherein the processing of the second event by the manage daemon is performed by writing the second event to a consume daemon contained within the manage daemon, wherein the consume daemon processes a change to the topic or channel based on the second event.

7. The system of claim 1, wherein the second category is configuration events.

8. A method comprising:

launching a subscribe daemon on a computer server, the subscribe daemon monitoring a first topic or channel on a message broker for published events of a first event category to the first topic or channel;

launching a manage daemon on the computer server, the manage daemon monitoring the first topic or channel on the message broker for published event of a second event category;

receiving, by the subscribe daemon, a first event, the first event belonging to the first category, published to the first topic or channel on the message broker;

receiving by the manage daemon, a second event, the second event belonging to the second category, published to the first topic or channel on the message broker; and causing the subscribe daemon to process the first event and the manage daemon to process the second event, the subscribe daemon performing its processing independently of the processing of the manage daemon.

9. The method of claim 8, wherein the manage daemon is connected to the message broker via a separate link than the subscribe daemon is connected to the message broker.

10. The method of claim 9, wherein the separate link is an AMQP link.

11. The method of claim 8, wherein the processing of the first event by the subscribe daemon is performed by writing the first event to an inbound event queue, which is monitored by a consume daemon, and wherein the consume daemon retrieves the first event from the event queue and publishes it to a first subscribing service.

12. The method of claim 11, wherein the processing of the second event by the manage daemon is performed by writing the second event to the inbound event queue, and wherein the consume daemon retrieves the second event from the event queue and processes a change to the topic or channel based on the second event.

13. The method of claim 11, wherein the processing of the second event by the manage daemon is performed by writing the second event to a consume daemon contained within the manage daemon, wherein the consume daemon processes a change to the topic or channel based on the second event.

14. The method of claim 8, wherein the second category is configuration events.

15. A non-transitory machine-readable medium storing instructions which, when executed by one or more processors, cause the one or more processors to perform operations comprising:

launching a subscribe daemon on a computer server, the subscribe daemon monitoring a first topic or channel on a message broker for published events of a first event category to the first topic or channel;

launching a manage daemon on the computer server, the manage daemon monitoring the first topic or channel on the message broker for published event of a second event category;

receiving, by the subscribe daemon, a first event, the first event belonging to the first category, published to the first topic or channel on the message broker;

receiving by the manage daemon, a second event, the second event belonging to the second category, published to the first topic or channel on the message broker; and causing the subscribe daemon to process the first event and the manage daemon to process the second event, the subscribe daemon performing its processing independently of the processing of the manage daemon.

16. The non-transitory machine-readable medium of claim 15, wherein the manage daemon is connected to the message broker via a separate link than the subscribe daemon is connected to the message broker.

17. The non-transitory machine-readable medium of claim 16, wherein the separate link is an AMQP link.

18. The non-transitory machine-readable medium of claim 15, wherein the processing of the first event by the subscribe daemon is performed by writing the first event to an inbound event queue, which is monitored by a consume daemon, and wherein the consume daemon retrieves the first event from the event queue and publishes it to a first subscribing service.

19. The non-transitory machine-readable medium of claim 18, wherein the processing of the second event by the manage daemon is performed by writing the second event to the inbound event queue, and wherein the consume daemon retrieves the second event from the event queue and processes a change to the topic or channel based on the second event.

20. The non-transitory machine-readable medium of claim 18, wherein the processing of the second event by the manage daemon is performed by writing the second event to a consume daemon contained within the manage daemon, wherein the consume daemon processes a change to the topic or channel based on the second event.

* * * * *